United States Patent [19]

Carrington

[11] Patent Number: 5,072,892

[45] Date of Patent: Dec. 17, 1991

[54] AERODYNAMIC DEVICE

[76] Inventor: Alfred C. Carrington, 33811 Morse St., Mount Clemens, Mich. 48043

[21] Appl. No.: 444,319

[22] Filed: Dec. 1, 1989

[51] Int. Cl.⁵ .................... B64C 29/04; B64C 29/02; B64C 29/00; B64C 15/00
[52] U.S. Cl. ................ 244/23 C; 244/12.2; 244/23 R
[58] Field of Search ............... 244/23 C, 12.2, 23 A, 244/23 R

[56] References Cited

U.S. PATENT DOCUMENTS

| | | | |
|---|---|---|---|
| 2,728,537 | 12/1955 | Elins | 244/23 C |
| 2,939,654 | 6/1960 | Coanda | |
| 2,974,902 | 3/1961 | Schofer | |
| 3,395,876 | 8/1968 | Green | 244/23 C |
| 3,640,489 | 2/1972 | Jaeger | |
| 3,774,865 | 11/1973 | Pinto | 244/23 C |
| 3,946,970 | 3/1976 | Blankenship | |
| 3,997,131 | 12/1976 | Kling | 244/23 R |
| 4,023,751 | 5/1977 | Richard | |
| 4,193,568 | 3/1980 | Heuvel | 244/23 C |
| 4,370,824 | 2/1983 | Resnicow | 244/23 C X |
| 4,433,819 | 2/1984 | Carrington | 244/12.2 |
| 4,457,476 | 7/1984 | Andresevitz | 244/23 |
| 4,778,128 | 10/1988 | Wright et al. | 244/23 |

Primary Examiner—Margaret A. Focarino
Assistant Examiner—James M. Kannofsky
Attorney, Agent, or Firm—Basile and Hanlon

[57] ABSTRACT

An aerodynamic vehicle includes a central body with a vertical axis, an outer wall and a bottom wall, a first rotatable disk concentric with the central body axis and rotatable in a first direction, a second rotatable disk concentric with the central body axis and rotatable in a second direction opposing the first direction, first and second blade members respectively mounted in the first and second disks draw fluid radially inward and vertically downward to compress the fluid into a funnel-shaped fluid passageway. Selectively vectorable nozzle members are in communication with the passageway for discharging the compressed fluid below the central body to provide lift for the aerodynamic vehicle. Jet engines are mounted on the device for providing additional thrust and for generating hydraulic and electric power for the vechicle control system. A second embodiment of the aerodynamic vehicle includes a generator for producing electrical power by forming the first and second blade members of magnetic material with alternating magnetic polarity which induces an electric current flow through a wire coil member disposed adjacent to the first and second rotating disks.

3 Claims, 3 Drawing Sheets

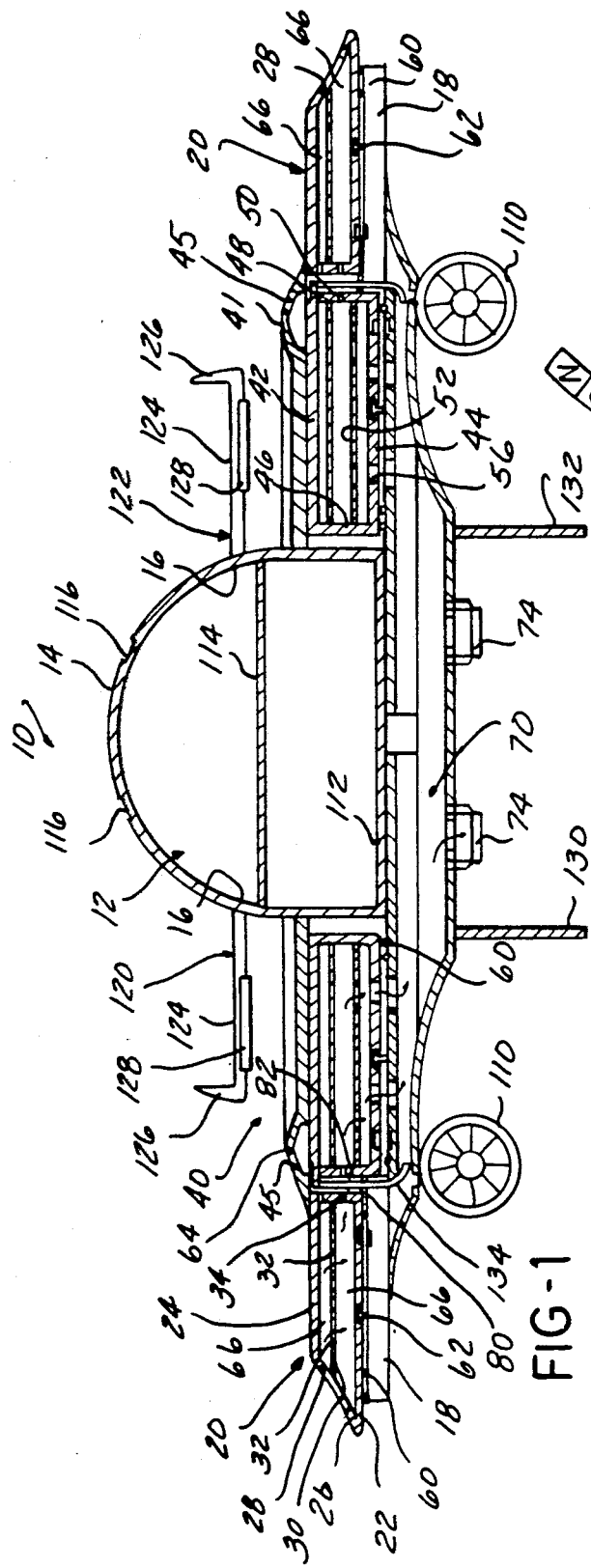
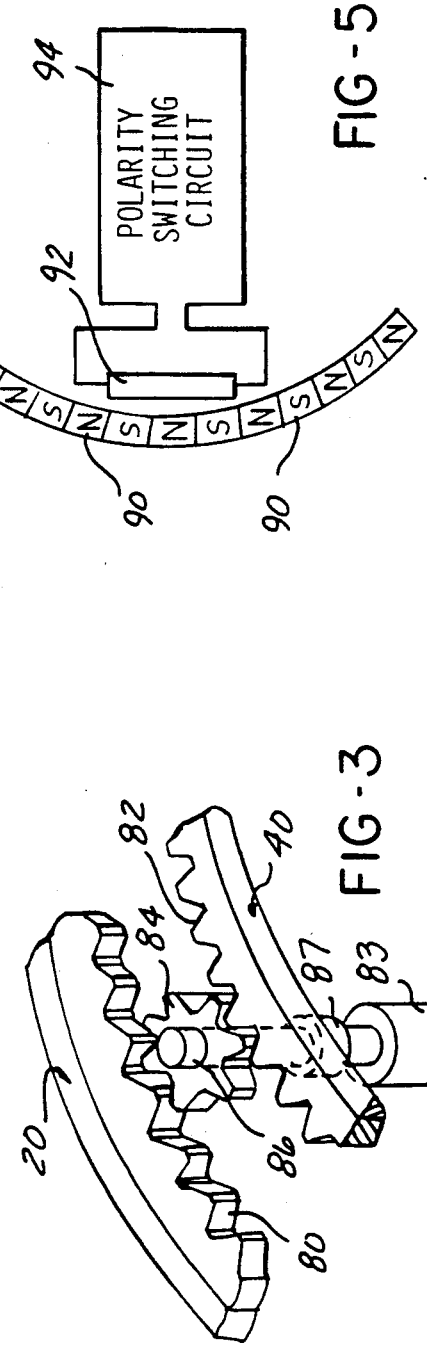
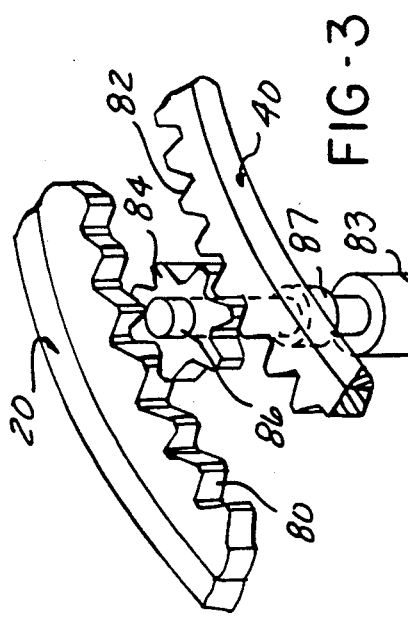

5,072,892

AERODYNAMIC DEVICE

BACKGROUND OF THE INVENTION

1. Field of the Invention

The present invention relates to the field of aerodynamic devices and, in particular, to the field of aerodynamic devices capable of vertical takeoff and landing.

2. Description of the Prior Art

Disk-shaped aerodynamic devices have long been known. U.S. Pat. Nos. 2,949,693; 3,109,256; 3,204,891; 3,394,906; 3,477,168; 3,508,360; 3,568,358; 4,065,873; and 4,433,819 are typical of prior art devices employing a rotatable disk for aerodynamic stability. Some of these prior art devices employ an internal combustion engine which drives a rotating propeller directing air downward, producing an upward reaction force to lift the device into the air. A torque reaction by the propeller causes the outer disk of the device to rotate in a direction opposite from the propeller. Vanes or blades rotatable with the disk are employed to impart further lift to the device as the disk rotates. None of these references disclose a central body which does not rotate in combination with first and second disks which rotate in opposite directions to balance the torque reaction resulting from the rotating disks.

SUMMARY OF THE INVENTION

The present invention includes a central body having a vertical axis, an outer wall, and a bottom wall. The central body is mounted on a frame formed of a plurality of radially extending, spaced beam-like frame members. A first, outer rotatable disk is mounted on the frame concentric with the central body axis is rotatable in a first direction. A second, inner rotatable disk is also mounted on the frame concentric with the central body axis and radially inward of the first disk and rotates in a second direction opposing the first direction of rotation of the first disk, such that the torque produced by the rotating disks is equal in magnitude and in opposite directions to nullify each other. First vane means in two stages are disposed in the first rotatable disk for drawing fluid radially inward and downward and compressing the fluid. Second vane means also in two stages are disposed in the second rotatable disk and receive the partially compressed fluid from the first disk and further compress the fluid before the fluid flows downward into a funnel-shaped plenum located below the second disk and mounted to the frame. Selectively vectorable nozzle means are mounted in communication with the plenum for discharging the compressed fluid below the central body into the atmosphere surrounding the vehicle to provide lift. Jet means are connected to the frame for providing additional thrust and lift to the vehicle and for generating electrical and hydraulic power. Means for rotating the first and second rotatable disks in opposite directions are also provided.

BRIEF DESCRIPTION OF THE DRAWINGS

In the drawings, like reference numerals refer to like parts throughout the several views, wherein:

FIG. 1 is a sectional side view of an aerodynamic device according to the present invention;

FIG. 3 is a partial view showing one embodiment of the means for rotating first and second disks in opposite directions;

FIG. 5 is a schematic view showing another embodiment of a means for rotating the first and second disks.

DESCRIPTION OF THE PREFERRED EMBODIMENTS

Figure 2:
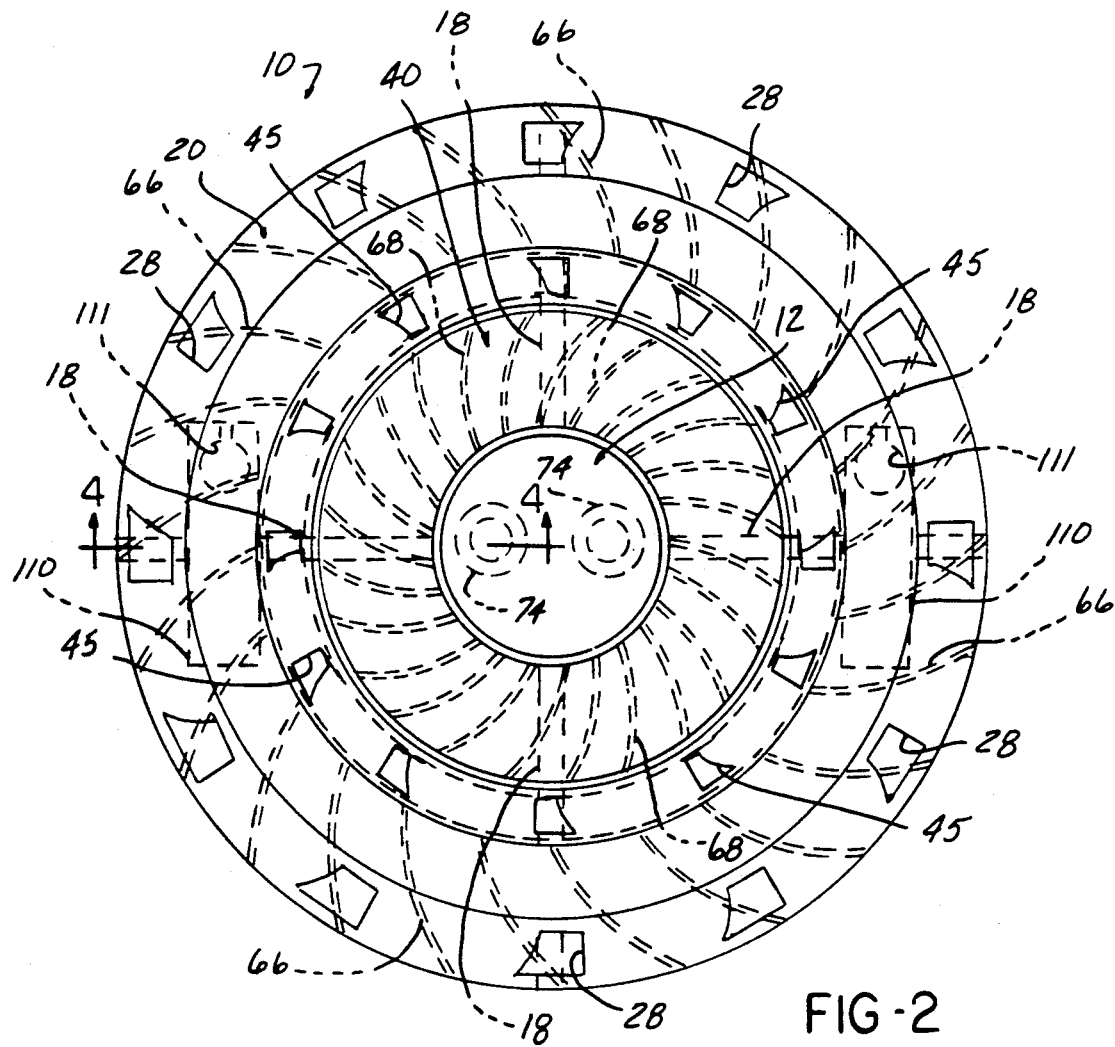
FIG. 2 is a plan view of the aerodynamic device shown in FIG. 1.

Referring now to the drawings and, in particular, to FIGS. 1 and 2, there is illustrated at 10 a preferred embodiment of the present invention comprising an aerodynamic device 10 including a central body 12 having a vertical axis. The central body 12 has a dome-shaped top 14 which joins downward and outward sloping sides 16.

The central body 12 is mounted on a frame formed of a plurality, preferably four, radially extending, circumferentially spaced beams or arms 18. The arms 18 extend radially outward from the central body 12 and provide support for the central body 12 and the remaining structure of the aerodynamic device 10. Each of the arms 18 extends radially from the central body 12 and inclines upward to a planar outer section as shown in FIG. 1.

A rotatable first, outer disk 20 encircles the central body 12 and is concentric therewith. The first outer disk 20 comprises a hollow body having a planar bottom wall 22, a planar upper wall 24 and a generally concave tapered outer connecting wall 26 extending between the bottom wall 22 and the upper wall 24. A plurality of tear drop shaped inlets 28 are circumferentially spaced about the outer wall 26 in the first outer disk 20 to provide an air intake path to the interior of the first disk 20.

A horizontally extending wall 30 extends through the center of the first outer disk 20 and divides the first outer disk 20 into upper and lower or first and second compartments or stages. A plurality of apertures 32 are formed in the horizontal wall 30 to provide air flow paths between the upper or first stage and the lower or second stage within the first disk 20. A plurality of outlets 34 are formed on an inner side wall in communication with the second stage of the first disk 20 to provide air flow out of the first disk 20 as will be described in greater detail hereafter.

A second, inner rotatable disk 40 encircles the central body 12 and is concentric about the vertical axis of the central body 12. The second disk 40 also comprises a hollow body having a top wall 42, a bottom wall 44 and opposed planar side walls 46 and 48. A plurality of air inlets 50 are formed in the side wall 48 in communication with the upper stage of the second disk 40 and receive air output from the first disk 20. A horizontal divider member 52 separates the second disk 40 into two stages. Apertures 54 are formed in the horizontal divider member to provide air flow between the two stages of the second disk 40. Further, air outlets 56 are provided in the bottom wall 44 of the second disk 40 to provide air flow for air compressed in the second disk 40 outward below the second disk 40.

Bearing races 60 are mounted in the frame arms 18 and the lower surface of each of the first and second disks 20 and 40. Further, guide means 62 such as, for example, an upwardly extending flange mounted on the frame arms 18 and extending into a correspondingly shaped slot formed in each of the first and second disks 20 and 40 about the circumference of the disks 20 and 40 is provided for maintaining the disks 20 and 40 in a fixed position relative to the frame during rotation of the first and second disks 20 and 40.

The facing surfaces between the first and second disks 20 and 40 include a plurality of apertures 34 and 50 allowing fluid flow therethrough during rotation of the disks 20 and 40. Suitable seal means are provided to maintain fluid pressure between the rotating first and second disks 20 and 40 about the facing surfaces of the first and second disks 20 and 40. The seal means may be in the form of a conventional seal member 64 mounted on the top surface of the second disk 40 which overlies the edge of the adjacent first disk 20.

Figure 4:
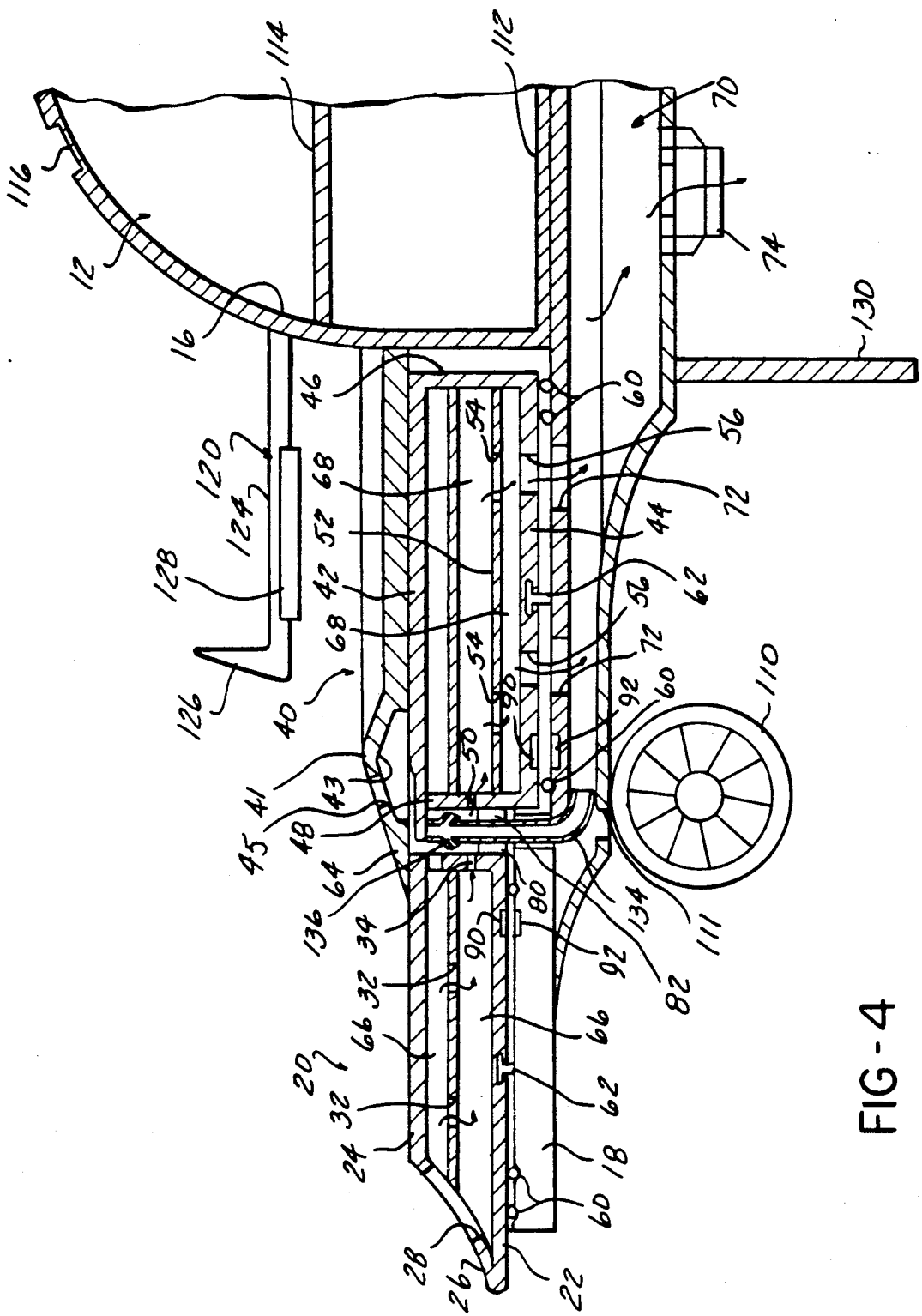
FIG. 4 is an enlarged, partial cross sectional view taken along line 4—4 in FIG. 3.

The first disk 20 includes first vane or blade means 66, FIGS. 1, 2 and 4, for drawing fluid vertically downward and radially inward through air inlets 28 to compress the fluid as the first disk 20 rotates. The first blade means 66 preferably includes a plurality of blades curving radially outward and axially downward. The blades 66 are disposed in each of the first and second stages of the first disk 20 to provide two stages of compression of the fluid drawn into the first disk 20.

The second disk 40 includes second blade or vane means 68 for drawing fluid from the first disk 20 through the apertures 34 and 50 and directing the fluid downward and radially inward to compress the fluid in two stages sufficiently to provide lift for the aerodynamic device 10. The second blade means 68 preferably includes a plurality of blades curving radially outward and axially downward in opposite directions to the radial and axial curvature of the first blade means 66.

An air flow chamber or plenum 70 is mounted to the bottom side of the frame 18 substantially below the second disk 40. The air chamber or plenum 70 comprises a hollow, funnel-shaped chamber sealingly attached at its outer ends to the frame arms 18, with a portion of the arms 18 sealingly extending outward therefrom as shown in FIGS. 1 and 4. The top wall of the plenum 70 includes a plurality of apertures 72 aligned with the apertures 56 in the second disk 40 to receive compressed air from the second disk 40. The plenum 70 directs the air flow downward from the second disk 40 to a plurality of nozzles 74. The nozzles 74 are mounted on the bottom surface of the plenum 70 and are selectively vectorable between vertical, tangential or radial directions, as disclosed and described in my previous U.S. Pat. No. 4,433,819, the contents of which is incorporated herein in its entirety by reference. In a preferred embodiment, two nozzles 74 are provided on the aerodynamic vehicle 10.

Means are provided for rotating the first disk 20 and the second disk 40. In one embodiment, shown in FIG. 3, the moving means includes vertically downwardly facing first gear teeth 80 disposed around the entire circumference of the disk 20 at a radial distance spaced from the vertical axis of the central body 12. The second rotatable disk 40 includes vertically upwardly facing second gear teeth 82 disposed around the entire circumference of the disk 40 radially spaced from the vertical axis of the central body 12 and spaced vertically to oppose the downwardly facing first gear teeth 80 of the first disk 20. As shown in FIG. 3, rotatably disposed between the first and second gear teeth, 80 and 82 respectively, is a meshing gear 84. The meshing gear 84 acts as an idle gear to drive the first and second rotatable disks, 20 and 40 respectively, in opposite directions. Preferably, at least one meshing gear 84 is secured to a rotatable shaft 86 which is driven by motor means 83, not shown, for driving the first and second disks, 20 and 40 respectively, about the vertical axis of the central body 12. It should be recognized that the rotatable shaft 86 can be coupled to the motor means 83 by an appropriate gear assembly 87 or transmission to provide the desired torque and rotation velocity necessary to drive the first and second rotatable disks, 20 and 40 respectively. Further, a clutch can be employed to disengage the gear 84 when disks 20 and 40 reach high speeds of rotation.

At higher speeds of rotation of the first and second disks 20 and 40, alternate moving means are employed. In this embodiment, as shown in FIGS. 4 and 5, a plurality of magnetic plates 90 of alternating magnetic polarity are mounted circumferentially about the inner periphery of the first disk 20 and about the outer periphery of the second disk 40. A magnetic field generating plate 92 is disposed in a spaced relationship with each of the alternating magnetic plates 90 in the first and second disks 20 and 40 and is mounted in the frame arms 18, for example.

The magnetic switching plates 92 are connected to a magnetic polarity switching network 94 controlled by a central computer 96 in a timed relationship which alternates the polarity of the switching plate 92 at a high switching speed thereby drawing toward and then pushing away the alternating polarity plates 90 of the adjacent first or second disk 20 or 40. Switching of the polarity of the switching plate 92 to an alternate polarity pulls the next plate 90 toward it and repels or pushes away the preceding plate 90. This results in high speed rotation of the first and second disks 20 and 40 in a manner similar to the operation of a linear magnetic motor.

Figure 6:
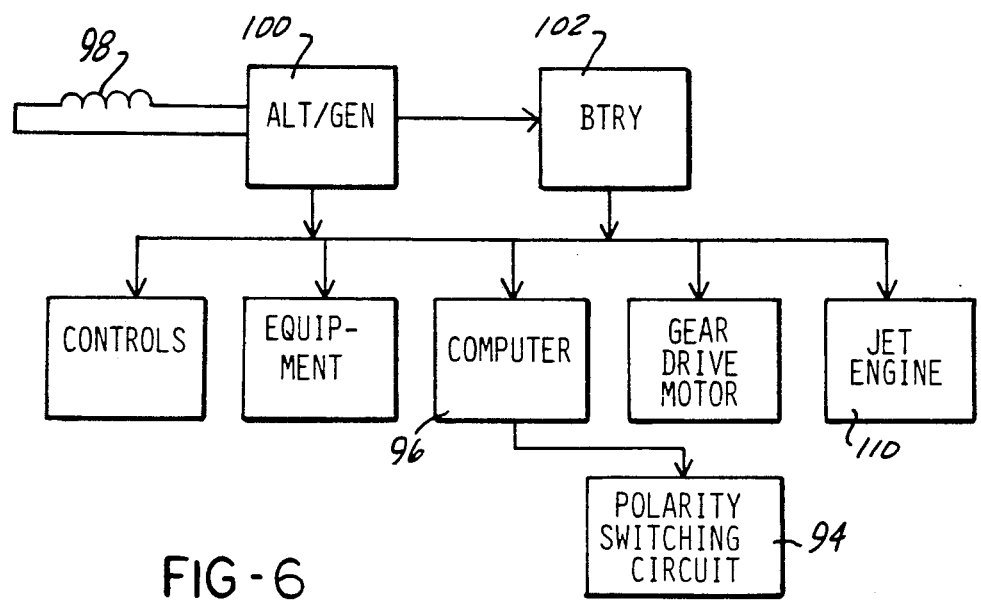
FIG. 6 is a block diagram of the electrical system of the aerodynamic device of the present invention.

The central computer 96, FIG. 6, may generate the alternating polarity switching signals through the polarity switching circuit 94 to the magnetic switching plates 92 at any desired sequence and in any predetermined timed relationship to provide varying rotational speeds of the first or second disks 20 or 40 at the same rotational rate or at different rotational rates depending upon lift, braking, decent or directional requirements. The central computer also varies the pulse switching sequence to compensate for the ram jet vortexing and mechanical inertial motion of the counter rotating disks 20 and 40.

It is believed that the pulse-power mode of operation to maintain a predetermined R.P.M. of the disks 20 and 40 would consume less energy than that accumulated by the vehicle and mechanical inertial motion while in operation due to the interaction of inertia ram jet vortexing and reduced drag characteristics of the vehicle. Additional lift force is generated by a vacuum implosion type force generated from the upper inlet surfaces of the disks 20 and 40.

In operation, when the disks 20 and 40 are at operating rotational speed, fluid, such as air is drawn into the first disk 20 and compressed by the blades 66 in two stages. The compressed fluid then passes to the second rotating disk 40 through the apertures 34 and 50 where it is further compressed in two stages. The final compressed fluid is directed through the apertures 56 in the bottom of the second disk 40 into the plenum 70 and then to the nozzles 74.

The vectorable nozzles 74 direct a high speed fluid stream out from the aerodynamic device 10 which provides a lift force for the device 10 urging the device 10 upward or gently downward during landing operations. Further, due to the vectorable nature of the nozzles 74, sideways, fore and aft movements may also be performed in a manner similar to conventional jet engines in vertical take off and landing aircraft.

In another embodiment, the first and second blades, 66 and 68 respectively, are composed of a magnetic material having a magnetic polarity. A coil of wire 98, FIG. 6, is mounted in or on the frame arms 18. As the first and second disks, 20 and 40, respectively, rotate in opposite directions, the magnetic lines of force of the blades 66 and 68 intersect the coil of wire 98, and induces an electric current in the coil 98. The coil 98 is connected to an alternator/generator 100 to produce electric current to power the equipment on board the aerodynamic device 10 and to recharge storage batteries 102, as shown in FIG. 6, and to also create an electromagnetic field around the device 10. The current can also be directed back to the computer controlled pulse switching circuit, described above. Inflight ram jet vortexing and reduced drag characteristics contribute to the high speed rotation of the disks 20 and 40 resulting in considerable mechanical inertia which can be employed by the alternator/generator 100 as a source of electrical power to operate the various vehicle systems.

The device 10 also includes an upwardly extending, annular member 41 which is mounted adjacent the outer periphery of the second disk 40 and overlays the edge of the facing inner peripheral surface of the first disk 20. The upwardly extending member 41 has a generally inclined face to direct air flow generated by rotation of the first disk 20 away in either stationary or in-flight modes from the second disk 40 so as to provide equalization of the air flow flowing over the first and second disks 20 and 40 which rotate in opposite directions about the central body 12.

The annular member 41 is hollow as shown in FIG. 4 by reference number 43, and includes a plurality of tear-drop shaped inlet apertures 45 circumferentially spaced therearound on the radially outboard side of the top surface of the member 41. The apertures 45 open into the hollow interior 43 of the annular member 41. The hollow interior 43 of the annular member 41 opens in turn to the first, upper stage of the first disk 20. Air flow through the apertures 45 is directed into the first disk 20 by an outer extension of the top wall 42 of the second disk 40 as shown in FIG. 4. This air flow combines with the air flow through the apertures 28 in the first disk 20 to increase the total volume of air intake into the first disk 20 and provides an additional vacuum force potential.

Conventional jet engines 110 are mounted on the frame of the central body 12 to produce a controllable thrust in tangential and vertical directions to propel the aerodynamic vehicle 10 in the desired direction. In operation, the jets 110 are started to provide electrical power to the aerodynamic vehicle 10. The batteries 102 supply the necessary cranking power to start the jets 110. When the jets 110 are at operating speed, electrical power is drawn from the jets 110 to rotate the first and second disks, 20 and 40 respectively, through the motor means. A selectively openable passage 111 connects the jets 110 to the plenum 70 and operates as a blow-by to equalize thrust and reduce fuel consumption of the jets 110, particularly at high speeds.

A horizontal deck 112 is spaced from and parallel to framework 18 of the aerodynamic vehicle 10. The horizontal deck 112 extends to the walls 16 of the central body 12 providing structural support therefor. The space between the deck 112 and the framework accommodates fuel tanks, controls, the gear motor means and its associated gear assembly. A command deck 114 is spaced above the horizontal deck 114 extending between the outer walls 16 of the central body 12 provides a compartment for the operator(s) of the vehicle 10. A plurality of windows 116 provide a view of the surrounding area around the aerodynamic vehicle 10. The jet engines 110 operate conventional hydraulic pumps and generators for generating electrical and hydraulic power for operating the control equipment on the vehicle 10.

As shown in FIG. 1, canard wings 120 and 122 are mounted to an upper portion of the central body 12 and extend horizontally outward therefrom. The canard wings 120 and 122 are identical in construction and each includes a horizontally extending wing lift surface 124 which terminates, in a preferred embodiment, in an upwardly extending wing tip 126. Extendible flaps and/or slats 128 are mounted adjacent the front or rear edge surfaces of each of the canard wings 120 and 122 and are extendible and retractable by conventional drive means, such as hydraulic motors, electromechanical ball screws, etc., not shown, operated by control signals from the central computer 96. In this manner, the canard wings 120 and 122 provide variable lift and directional control for the vehicle 10.

Vertically extending canard wings 130 and 132 may also be provided for further stability of the aerodynamic vehicle 10. The canard wings 130 and 132 have a planar configuration and are mounted to the frame 18 of the central body 12 and extend vertically downward therefrom.

Additional means may be provided for sealing the air flow passage between the opposed surfaces of the first disk 20 and the second disk 40 as shown in FIG. 4. The seal means comprises a plurality of elongated conduits 134 which are closed at an upper end and are open and disposed in fluid flow communication with the plenum 70 so as to receive highly compressed fluid therefrom. At least one and preferably a plurality of such conduits 134 are disposed in a circumferential manner between the opposed surfaces of the first and second disks 20 and 40. A pair of outlets 136 are formed in each conduit 134 below the closed upper end to direct the high compressed fluid flow downward as it exits the conduit 134 thereby insuring that the fluid flow from the first disk 20 to the second disk 40 will remain in a downward radially inward path rather than escaping upward.

What is claimed is:
1. An aerodynamic vehicle comprising:
a central body including a vertical axis, an outer wall, and a bottom wall;
a first rotatable disk concentric with the central body axis, said first disk rotatable in a first direction;
a second rotatable disk concentric with the central body axis, said second disk rotatable in a second direction opposing the first direction;
first vane means connected to the first disk for drawing fluid vertically downward and radially inward to compress the fluid;
second vane means connected to the second disk for drawing fluid vertically downward and radially inward to compress the fluid;

passage means for conveying the compressed fluid from the first and second vane means;

selectively vectorable nozzle means, in communication with the passage means, for discharging the compressed fluid below the central body;

means for rotating the first and second disks in opposite directions to counteract torque generated by the first and second disks; and jet means connected to the central body for providing additional thrust to the vehicle and for generating electrical and hydraulic power.

2. The aerodynamic vehicle of claim 1, wherein the rotating means comprises:

motor means for driving a drive shaft;

gear means for selectively varying torque and angular velocity of an output shaft driven by the drive shaft;

first gear teeth connected to the first disk and extending outward therefrom;

second gear teeth connected to the second disk and extending outward therefrom to a position opposing and spaced from the first gear teeth; and gear means attached to the output shaft and engageable with the first and second gear teeth for imparting rotation to the first and second disks in opposing rotational directions.

3. The aerodynamic vehicle of claim 1 further comprising:

generator means, including said first and second disks, for producing electrical power.

* * * * *